United States Patent [19]

King

[11] Patent Number: 5,103,513
[45] Date of Patent: Apr. 14, 1992

[54] MAGNETIC-CUSHIONED SUPPORT FOR BED OR SEAT

[76] Inventor: E. Autry King, Rte. 12, Box 770, Cullman, Ala. 35055

[21] Appl. No.: 236,559

[22] Filed: Aug. 25, 1988

[51] Int. Cl.$^5$ .......................................... A47C 17/64
[52] U.S. Cl. ........................................ 5/118; 5/400; 5/186.1; 5/448
[58] Field of Search .................. 5/118, 186 R, 186 B, 5/400, 401, 446, 447, 448, 420, 481, 459, 481; 52/309.11, 309.9; 265, 309.15; 335/301; 428/318.4

[56] References Cited

U.S. PATENT DOCUMENTS

| | | | |
|---|---|---|---|
| 2,904,364 | 9/1959 | Korodi | 292/251.5 |
| 3,138,806 | 6/1964 | Goodman et al. | 5/401 |
| 3,353,194 | 11/1967 | Matson | 5/118 |
| 3,460,083 | 8/1969 | Johnson | 335/301 |
| 3,524,673 | 8/1970 | Cramer et al. | 5/118 X |
| 3,604,027 | 9/1971 | Konno | 297/284 X |
| 3,712,004 | 1/1973 | Loebsack | 52/265 |
| 4,147,004 | 4/1979 | Day et al. | 52/309.11 X |
| 4,181,991 | 1/1980 | Morgan et al. | 5/186 R X |
| 4,696,071 | 9/1987 | Santo | 5/400 X |

FOREIGN PATENT DOCUMENTS

| | | | |
|---|---|---|---|
| 706565 | 3/1965 | Canada | 5/118 |
| 2738529 | 3/1979 | Fed. Rep. of Germany | 5/447 |
| 2407692 | 7/1979 | France . | |

Primary Examiner—Renee S. Luebke
Assistant Examiner—Michael J. Milano
Attorney, Agent, or Firm—Foley & Lardner

[57] ABSTRACT

A magnetically cushioned support structure for a mattress or seat includes a pair of spaced-apart, aligned sheets of non-magnetic material, each sheet having magnets disposed on its inner face in opposition to magnets on the other sheet, with the opposing magnet faces in each magnet pair having like polarity. The two magnet-supporting sheets are secured to one another by blocks of low-density polymeric foam material disposed between the sheets. The weight of a sleeper is supported by magnetic repulsive force, and the two sheets are held in alignment with one another by the foam blocks. Contact of the upper sheet with walls or support structure of a sleeper cab is prevented, thus isolating the top of the structure from vibration.

2 Claims, 2 Drawing Sheets

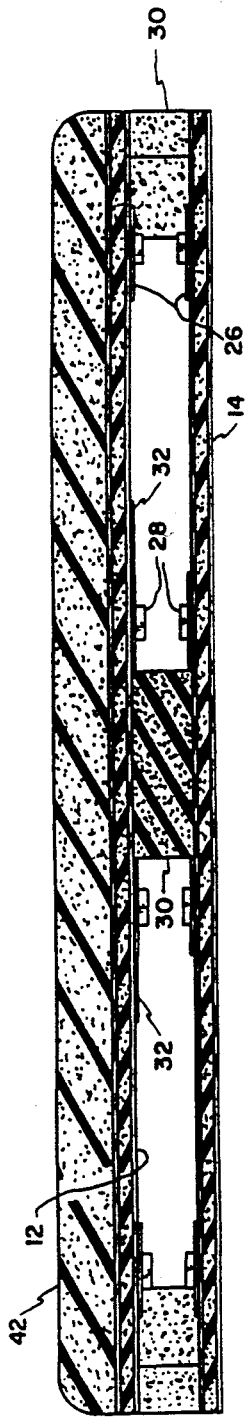
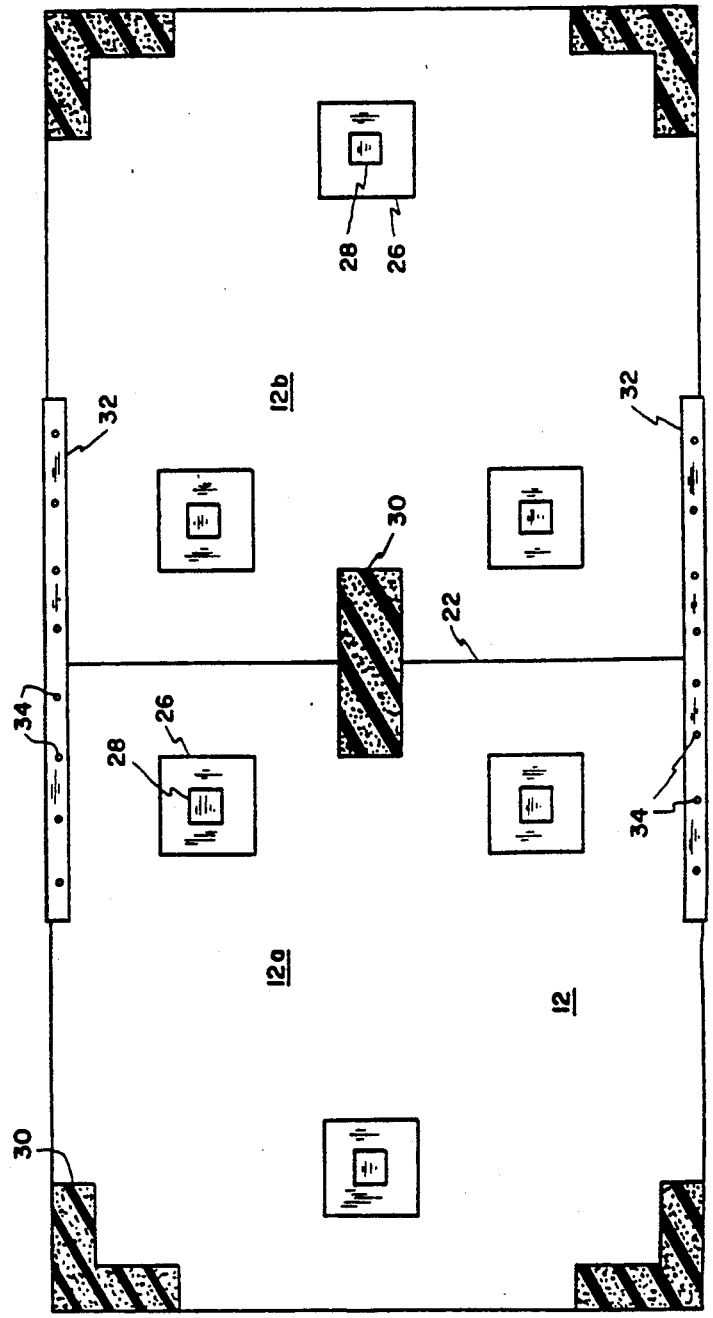

MAGNETIC-CUSHIONED SUPPORT FOR BED OR SEAT

FIELD OF THE INVENTION

This invention relates generally to cushioned furniture and more particularly to beds or seats for use in a vibration environment, such as aboard trucks or other motor vehicles.

BACKGROUND OF THE INVENTION

Many situations arise where vibration-damping isolation of a mattress or seat cushion from its support frame would be highly desirable. Long-distance trucking operators commonly use team drivers who take turns driving and sleeping in a bed provided for that purpose behind the seats in the cab of the tractor that pulls the trailer. Obtaining adequate sleep in a tractor cab is difficult, however, owing to the high level of vibration to which the cab is subjected, whether moving or parked with the engine running. Existing sleeper beds for tractor cabs have mattresses that absorb some of the vibration, but much of it is transmitted to the driver occupying the bed, keeping him from obtaining uninterrupted sleep for an extended period. As a result, the driver who is attempting to sleep may be unable to do so to the extent necessary to relieve fatigue. The implications of having a fatigued driver instead of a fully rested one at the wheel are readily apparent. The fully rested driver is much less likely to become involved in an accident. Also, the fully rested driver will function more efficiently, which means increased revenue to the trucking company by helping him to make local points and schedules on time and producing a better attitude toward taking care of the truck, which is a very large investment for the owner.

Magnetic cushioning of mattresses and seats is disclosed in certain prior patents. U.S. Pat. No. 3,604,027 shows the use of electromagnets mounted on spaced-apart plates in a seat cushion, one plate being secured to the seat frame and the other to the underside of the seat cushion. Mechanical springs coupling the upper and lower plates are also provided. This structure does not provide effective isolation of the cushion from vibrations to which the frame might be subjected because the vibrations would be transmitted through the springs. Another approach is disclosed in West Germany Patent No. 2,738,529 wherein a mattress employs two layers of large numbers of circular magnets supported on sheets of material in spaced-apart relation with magnet faces of like polarity opposing one another so as to provide repulsion between the two layers, thus cushioning the top of the mattress when it is supporting the weight of a sleeper. The mattress shown in this patent also fails to provide isolation of the mattress top from vibrations to which the supporting frame might be subjected, and therefore it would not be effective for vibration environments such as exist in sleeper cabs on trucks. As shown in the drawing, the top covering of the mattress of this patent, which has the top layer of magnets secured to its underside, is secured to a side frame support so that vibrations from the frame support would be readily transmitted to the sleeper.

SUMMARY OF THE INVENTION

The present invention is directed to a magnetically cushioned mattress or seat support having a pair of spaced-apart supporting sheets of non-magnetic material, each sheet having a plurality of magnets secured thereto so as to provide a plurality of magnet pairs, with magnet faces of like polarity disposed in spaced-apart, repulsive alignment to one another. The sheets are secured to one another by a plurality of blocks of low-density foam material placed in the space between the opposing sheets. Preferably, the supporting sheets may each comprise a sandwich of two pieces of thin wooden material, such as paneling, with a thicker layer of rigid foam material disposed between the two wooden layers. The supporting sheets are sized such that when placed in a bed such as a sleeper bed of a tractor trailer cab, edges of the sheets will be spaced apart from walls of the cab or other cab hardware, thus preventing transmission of vibrations through sheet edges. This construction also effectively minimizes transmission of vibrations from the lower sheet, which is coupled to the vehicle, to the upper sheet that supports the body of a sleeper. The weight of a sleeper is supported by magnetic repulsion forces, while the low-density foam blocks retain the upper sheet in position aligned with the lower sheet without transmitting a significant amount of vibration. Uninterrupted sleep by team drivers is thus facilitated.

It is, therefore, an object of this invention to provide a magnetically cushioned support structure for a mattress or seat.

Another object is to provide a mattress structure having its upper surface mechanically isolated from its support frame.

Another object is to provide a vibration-damping, magnetically cushioned mattress for sleeper cabs of tractor trailer trucks.

Yet another object is to provide a magnetically cushioned mattress for a sleeper cab that provides effective isolation of vibration, consistent with sufficient internal strength to maintain its top in alignment spaced apart from cab walls.

Other objects and advantages will be apparent from the following detailed description and claims appended hereto.

BRIEF DESCIPTION OF THE DRAWINGS

FIG. 2 is a sectional view taken along line 2—2 of FIG. 1.

FIG. 3 is a sectional view taken along line 3—3 of FIG. 1.

DESCRIPTION OF THE PREFERRED EMBODIMENT

Figure 1:
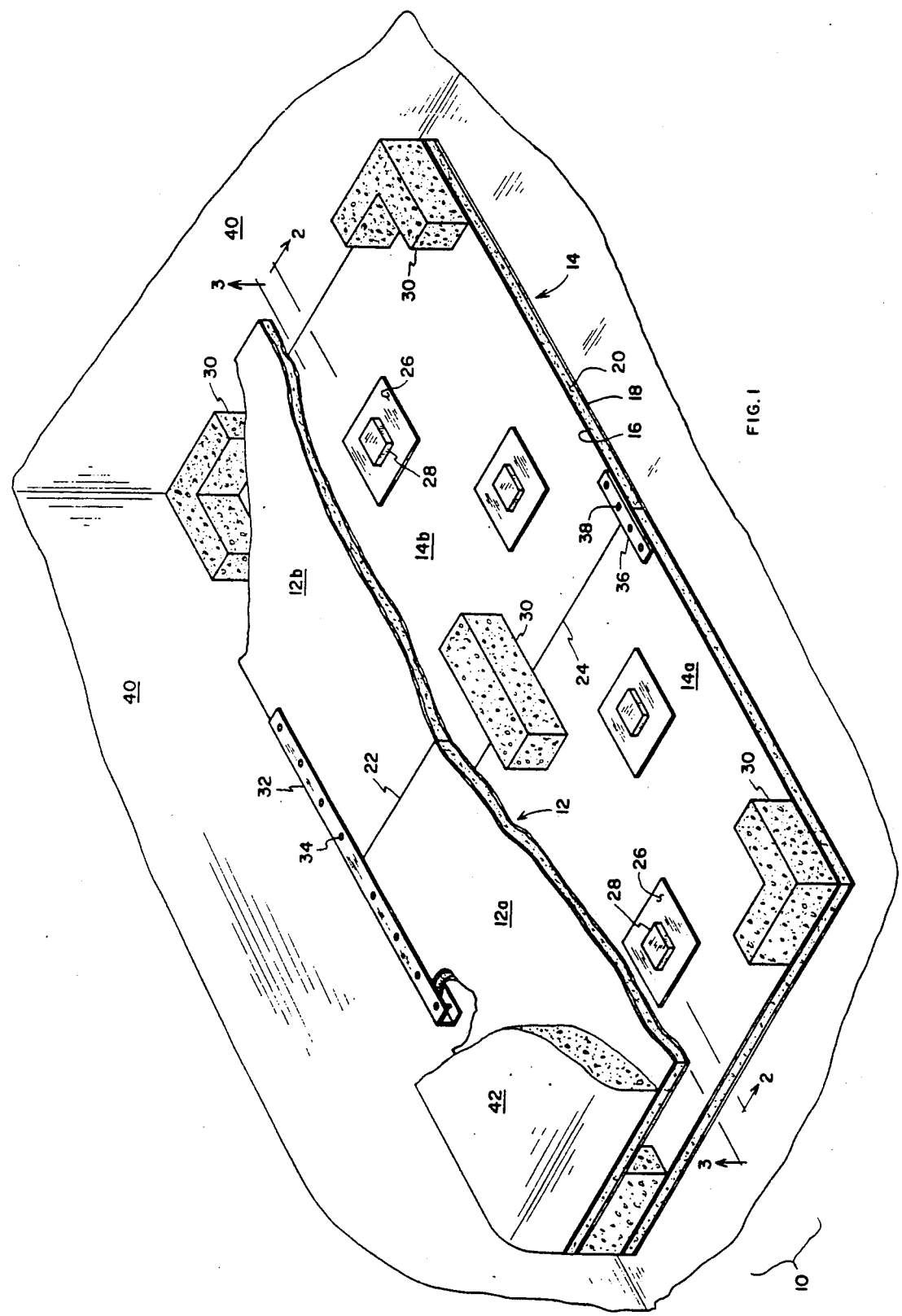
FIG. 1 is a pictorial view, partly broken away, of a mattress assembly embodying the invention in place in a sleeper cab of a trailer truck tractor.

A mattress assembly 10 for use in a sleeper bed of a tractor trailer cab is shown in FIG. 1. The mattress assembly has an upper supporting composite sheet 12 and lower supporting composite sheet 14 of non-magnetic material disposed in spaced apart, facing relationship with one another. These composite sheets may comprise a sandwich structure including a top layer 16 and a bottom layer 18 of thin wooden panel material, with a thicker, for example, one-inch layer 20 of rigid polymeric foam, such as polystyrene, disposed between the wooden layers and bonded thereto. The rigid foam layer serves to stabilize and reinforce the composite, while contributing a minimal amount of weight to the overall mattress structure, and it also provides thermal insulation. In order to enable installation in the tight confines of a tractor trailer cab, sheets 12 and 14 are cut in half at seams 22 and 24, providing sheet portions 12a, 12b, 14a, and 14b. Upper sheet 12 has secured to its lower face and lower sheet 14 has secured to its upper face a plurality of magnetic metal plates 26 on which are mounted magnets 28, the plates having an area about four times the area of the magnets so as to increase the strength of the resulting magnetic field.

Magnets secured to the respective sheets have faces of like polarity disposed in opposition to one another so as to provide repulsion between the sheets, with the magnets being aligned in pairs opposing one another. While the invention is not to be understood as limited to a particular type or arrangement of magnets, neodymium magnets two inches by two inches and one-half inch thick and having a pull strength of six hundred pounds may be advantangeously used. Such magnets are available from I.G. Technology, Valpariso, Ind., under the designation N30. Using such magnets a total of six pairs are employed, with three pairs on each half and with four of the six disposed toward the middle of the mattress so as to provide maximum support to the sleeper's body in the middle area of the bed, with the other two pairs providing less support at the foot and head of the bed. The number and spacing of magnets may be varied for other sizes and types of magnets.

In order to maintain upper composite sheet 12 in alignment with lower composite sheet 14, the inner faces of the sheets have secured thereto blocks 30 of low density polymeric foam material, such as low-density polyurethene, which material is commonly available in rolls or sheets as cushioning material. As shown in FIG. 1, L-shaped blocks are disposed at each corner, spaced-apart from the magnet pairs, and in the middle of the mattress across seams 22 and 24. In the embodiment shown, for a mattress 70 inches long by 32 inches wide, the corner blocks may be L-shaped, 8 inches long along their outer edges, 3 inches wide across the legs of the L, and 4 inches thick. The block extending across seam 24 may be 16 inches long, 5 inches wide, and 4 inches thick. The corner blocks provide enhanced resistance to movement of the top composite sheet with respect to the bottom one both longitudinally and transversely owing to a difference in physical properties in longitudinal and transverse directions of low-density foam material as provided in rolls, that is, movement of the top face of this material with respect to its lower face is inherently restrained more in one direction than in the other. By use of L-shaped blocks, one leg provides enhanced stability along the length of the bed, and the other leg provides enhanced stability across the bed. The block disposed across seam 24 is cut preferably from along the length of a sheet or roll of foam block material to provide maximum stability along the length of the mattress.

Composite sheet halves 12a and 12b are secured to one another in edgewise relation by means of U-shaped metal channel members 32 enclosing the outer edge of the composite sheet along its length across seam 22 and extending a distance of 30 inches. Screws or bolts 34 extending through the composite sheet are provided to hold the channel member in place. Composite sheet halves 14a and 14b are secured together by metal strips 36 extending along the sheet edge across seam 24 and held in place by screws 38.

In order to ensure isolation of the mattress from vibrations transmitted by a tractor cab in which it is located, the top supporting sheet is sized so that its edges are spaced apart from any walls 40 of the compartment wherein the mattress is to be installed. A spacing of at least about one inch away from such walls is suitable for this purpose for the embodiment shown. Movement of the top sheet for distances such as would bring its edges into contact with the walls is prevented by means of the foam blocks as described above. A mattress pad 42, which may be a block of conventional foam rubber material, is shown disposed on top of composite sheet 12 to provide cushioning for a sleeper in the manner of a conventional bed. Other types of mattress pads may also be used.

The support structure described above may also be advantageously used as a platform for supporting fragile articles or hazardous materials in shipment in vehicles subject to vibration. Such structure can also be used as a cushioned platform for industrial workers to stand on, for example, in assembly lines.

The structure described above with reference to FIG. 1 may also be used in a suitably sized version as a seat, the top of the seat cushion being isolated from vibrations in the same manner as for a mattress. Seats embodying the invention may be advantageously used in trucks, tractors, and other motor vehicles that are subject to a vibration environment.

Various modifications to the above-described mattress support may be employed within the scope of the invention. For example, instead of a sandwich composite sheet structure for sheets 12 and 14, to which the magnets are secured, a unitary sheet of non-magnetic material, such as plywood or fiberglass, may be used. Also, the sheets and blocks of material in the structure may be secured together by various methods, although adhesive bonding is preferred.

I claim:

1. A mattress support structure for a motor vehicle sleeper bed comprising:
    a first rectangular sheet of non-magnetic material adapted to be secured to a horizontal surface of a sleeper bed compartment and having a plurality of magnets disposed in spaced-apart relation from one another on its top face;
    a second rectangular sheet of non-magnetic material disposed above said first sheet in spaced-apart, facing and aligned relation thereto and having a plurality of magnets on its lower surface corresponding to and opposing said magnets on said first sheet, the resulting magnet pairs having faces of like polarity opposite one another;
    four L-shaped blocks of low-density polymeric foam material in block form disposed between and secured to each of said sheets, one each of which is disposed between said sheets at each corner thereof;
    said first sheet and said second sheet of non-magnetic material with magnets on opposing surfaces thereof being isolated from one another except for said low-density polymeric foam material in block form;
    a separate magnetic metal plate disposed between each said magnet and the sheet face to which the magnet is secured;
    whereby the repulsive forces produced by said magnet pair may support the weight of a sleeper's body on said upper sheet, movement of said second sheet out of alignment with said first sheet is restrained by said foam material, and transmission of vibrations from said compartment surface to said second sheet is minimized.

2. A mattress support structure as defined in claim 1 wherein the area of each of said plates is about four times the area of its adjacent magnet.

* * * * *